United States Patent [19]

Lobb

[11] 4,027,949

[45] June 7, 1977

[54] OPTICAL SYSTEMS

[75] Inventor: Daniel Richard Lobb, Farnborough, England

[73] Assignee: Redifon Limited, London, England

[22] Filed: Sept. 23, 1975

[21] Appl. No.: 616,078

[30] Foreign Application Priority Data

May 13, 1975 United Kingdom ............ 20001/75
June 8, 1971 United Kingdom ............ 19417/71

[52] U.S. Cl. ............................... 350/150; 350/151; 350/157
[51] Int. Cl.² ......................................... G02B 27/00
[58] Field of Search .................. 350/150, 151, 157

[56] References Cited
UNITED STATES PATENTS

| | | | |
|---|---|---|---|
| 2,753,763 | 7/1956 | Haines | 350/150 |
| 2,780,958 | 2/1957 | Wiley | 350/150 |
| 3,813,144 | 5/1974 | Kumada et al. | 350/150 |

Primary Examiner—John K. Corbin
Assistant Examiner—Richard A. Rosenberger
Attorney, Agent, or Firm—Larson, Taylor and Hinds

[57] ABSTRACT

An optical system for selectively modulating one or more colors of light in a polychromatic light beam. Using a laser source, all colors are initially plane polarized in a preferred direction. Any selected color is modulated using an electro-optic cell with an optical waveplate both before and following. The first waveplate rotates the direction of polarization of that selected color or another color to a direction at 45° to the preferred direction. The electro-optic cell resolves incident light, solely of the selected color, into two right angle components polarized at ±45° to the polarization of said another color. The relative amplitudes of the components is determined by an electrical signal applied to the cell. The second waveplate also rotates the direction of polarization of said selected color or said another color by 45°. A final optical analyzer passes one component of all modulated colors while inhibiting the other component.

14 Claims, 2 Drawing Figures

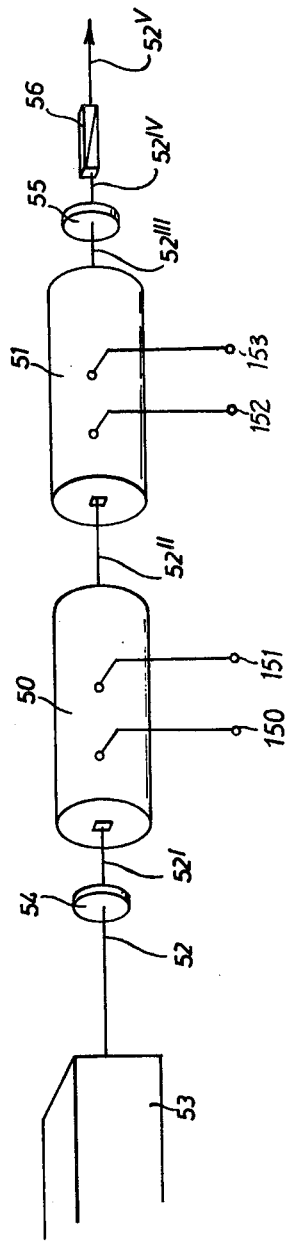
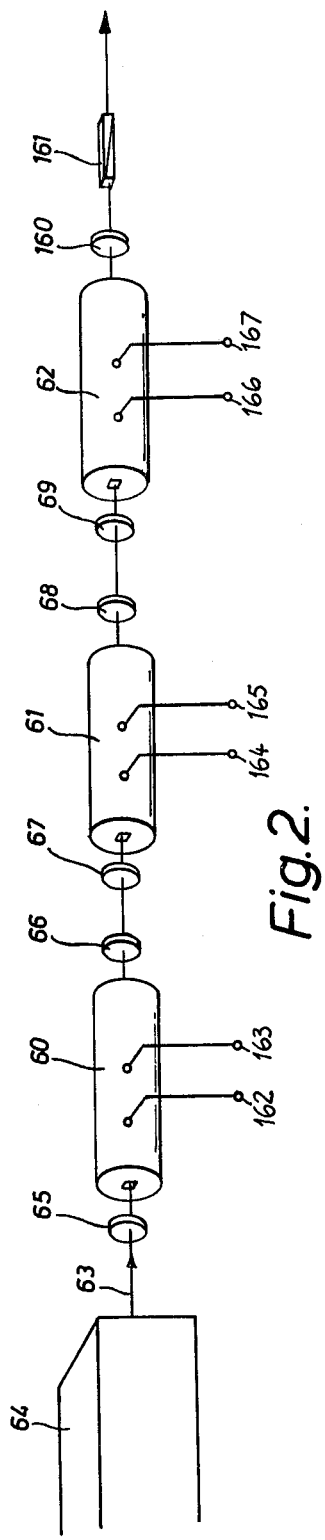

OPTICAL SYSTEMS

This invention relates to optical systems for intensity modulation of radiation of one or more selected radiation wavelengths in a polychromatic beam.

Separate intensity modulation of different wavelength constituents of a polychromatic beam can be effected by splitting the beam into separate components following different paths, each of which includes a separate intensity modulating device, and by then recombining the modulated constituents into a single beam.

By contrast the present invention is concerned with optical systems wherein a single wavelength constituent is modulated, or wherein different wavelength constituents are differently modulated, without spatial separation.

The invention is of particular value in modulation of polychromatic laser beams, though it may also be used to provide modulation of radiation from sources other than lasers.

The invention has one application in visual display systems in which a picture is built up by scanning an intensity modulated laser beam across a light-diffusing surface. Such display systems have been described as "laser television".

In such systems, colour is provided in the display by using a polychromatic laser beam in which different colours are differently intensity modulated. Normally, three video signals are provided, corresponding respectively to the red, green and blue components of the required picture. These signals are each used to drive one of three electro-optic intensity modulation cells. Through these cells are passed respectively, a red laser beam, a green laser beam and a blue laser beam. After separate modulation, the three laser beams are combined to form a single beam which is then scanned over a viewing screen.

Typically, the red beam is provided by a Krpyton ion laser, (which however is also capable of providing all three required colours simultaneously), while a mixture of green and blue light is provided in the beam from an Argon ion laser.

In known laser television systems, it has been the practice to separate the blue and green components of the Argon laser beam, for separate intensity modulation. Two methods have been used for separation of different colour components of a polychromatic beam. These are: First, the use of dispersing prisms, and Second, the use of thin film beam-splitting mirrors. Dispersing prism devices may be made efficient, but are necessarily complex and bulky and are relatively difficult to keep in adjustment. Thin film beam-splitting mirrors are normally made dichroic, in the application under consideration, to maximise their reflection for one colour and their transmission for the other. However, when the colours to be separated have similar wavelengths, as do the Argon laser blue and green components, dichroic mirrors are inefficient and provide an incomplete colour separation.

The known method of prism dispersion may also be used in the combination of beams after separate modulation. However, dichroic mirrors have usually been preferred for this purpose, due to the aforementioned disadvantages of prism dispersion devices. Dichroic mirrors used for combination of different colours are again inefficient where the colours to be combined have similar wavelengths, in this case a large proportion of the light being lost.

An object of the present invention is to provide an improved method of construction for a polychromatic laser beam modulation unit. A laser beam modulation unit according to the invention provides for different intensity modulation of different wavelength constituents in a polychromatic beam, substantially without spacially dividing the polychromatic beam within the unit. Merits of such an arrangement over previous methods are in its simplicity of construction, efficiency and ease of adjustment.

Accordingly, the invention provides an optical system comprising a source of a beam of plane polarised polychromatic radiation, and, in sequence in the path of the radiation beam an input birefringent optical waveplate, a first controllably birefringent electro-optic cell, an output birefringent optical waveplate, and an optical analyser; the radiation beam comprising two constituents distinguished by radiation wavelength; each birefringent optical waveplate being designed and arranged substantially to rotate the direction of polarisation of one beam constituent through 45° while leaving the state of polarisation of the other beam constituent substantially unaltered; the electro-optic cell being arranged to resolve a first radiation constituent into two substantially equal parts plane polarized at right angles and introduce a relative phase shift between these two parts, the magnitude of the phase shift being determined by an electrical signal applied to the first electro-optic cell, while leaving the state of polarisation of the second beam constituent substantially unaltered, whereby the first radiation constituent is polarisation modulated while the second radiation constituent is substantially unaffected; the optical analyser being arranged to transmit radiation plane polarised in a preferred direction at 45° to the directions of polarisation of the plane polarised parts of the first radiation constituent, thus converting the polarisation modulation of the first radiation constituent into intensity modulation, controlled by the electrical signal applied to the first electro-optic cell.

In a preferred embodiment of the invention, for modulation of two radiation constituents, a second controllably birefringent electro-optic cell is included in the radiation path between the first electro-optic cell and the output birefringent optical waveplate, the second electro-optic cell being arranged to resolve the second radiation constituent into two substantially equal parts plane polarised at right angles and introduce a relative phase shift between these two parts, the magnitude of the phase shift being determined by an electrical signal applied to the second electro-optic cell, while the state of polarisation of the first radiation constituent is substantially unaltered, whereby the second radiation constituent is polarisation modulated while the first radiation constituent is substantially unaffected; the optical analyser converting the polarisation modulation of both radiation constituents into intensity modulation, the intensity modulation of the first radiation constituent being determined substantially only by the electrical signal applied to the first electro-optic cell, while the intensity modulation of the second radiation constituent is determined substantially only by the electrical signal applied to the second electro-optic cell.

Another embodiment of the invention, for modulation of a plurality of radiation constituents distinguished by wavelength, of which the said first radiation constituent is one, comprises, in sequence in the radiation path between the radiation source and the optical analyser, a set of sub-systems, each sub-system comprising, in sequence in the radiation path, a first birefringent optical waveplate, a controllably birefringent electro-optic cell and a second birefringent optical waveplate; the said input optical waveplate, first electro-optic cell and output optical waveplate together forming one such sub-system; each sub-system providing polarisation modulation of a different selected radiation constituent while leaving the polarisation of other radiation constituents substantially unaltered; in each sub-system the first and second optical waveplates being designed and arranged substantially to produce relative rotation of 45° between the directions of polarisation of the selected radiation constituent and the other radiation constituents; the electro-optic cell being arranged to resolve the selected radiation constituent into two substantially equal parts polarised at right angles and introduce a relative phase shift between these two parts, the magnitude of the phase shift being determined by an electrical signal applied to the electro-optic cell, while leaving the polarisation of the other radiation constituents substantially unaffected, whereby the selected radiation constituent is polarisation modulated while the remaining radiation constituents are effectively unaltered; the number of sub-systems thus providing substantially separate polarisation modulation for an equal number of selected radiation constituents the polarisation modulation of all constituents being converted into intensity modulation by the optical analyser, the intensity modulation of each radiation constituent being determined by the electrical signal applied to the corresponding electro-optic cell.

The invention further provides an optical system comprising a light source at the commencement of a light path passing in sequence through a first birefringent optical waveplate means, a first controllably birefringent electro-optic cell, second birefringent optical waveplate means and an optical analyser; the light source providing light of first and second wavelengths plane polarised in a first polarisation direction; the first optical waveplate means being arranged to alter the direction of polarisation of light of said second wavelength to a second direction at substantially 45° to the first direction while leaving the direction of polarisation of light of said first wavelength unchanged; the electro-optic cell being arranged to introduce a relative phase shift between light plane polarised in the first direction and light plane polarised in a direction at 90° to the first direction; the magnitude of the phase shift being determined by an electric signal applied to the electro-optic cell, whereby light of said second wavelength is polarisation modulated but the polarisation of light of said first wavelength is unaltered; the second optical waveplate means being arranged to convert the polarisation modulated light into light formed of two plane polarised components in phase quadrature respectively parallel and perpendicular to said first direction; the amplitude of the two components being a function of the signal applied to the electro-optic cell, while leaving the polarisation of light of the first wavelength unchanged; and the optical analyser being arranged selectively to permit passage along the said light path of light polarised in a preferred direction but to inhibit passage therealong of light polarised in the direction at right angles to the preferred direction, the preferred direction being the first direction or a direction at 90° thereto, and thereby to inhibit one component of light of the said second wavelength.

The use of controllably birefringent electro-optic cells for polarisation modulation of radiation is well known, and it is well known to use optical analysers with such electro-optic cells in order to provide intensity modulation. Both Pockels and Kerr cells have commonly been used with analysers for intensity modulation, and both these forms of electro-optic cell are suitable for use in apparatus according to the invention.

It is usual, as in the invention, for the plane polarised beam which is to be modulated to be resolved by the electro-optic cell into two substantially equal parts polarized at right angles, and for a phase shift to be introduced between these two parts, controlled by an electrical signal applied to the electro-optic cell. For the two parts to be equal, the electro-optic cell must be oriented so that its fast polarisation axis is at 45° to the direction of polarisation of the incident beam. When the two parts emerge from the electro-optic cell they may conveniently be regarded as forming a beam with two components in phase quadrature, polarised respectively parallel and perpendicular to the polarisation direction of the incident beam, the relative intensity of the two components being determined by the phase shift introduced in the cell, which is in turn determined by the signal applied to the electro-optic cell. This description of the emergent beam is convenient since one of the two components is eventually to be absorbed by the analyser while the other component is transmitted.

In apparatus provided by the present invention, radiation of different wavelengths is selectively modulated by use of selective orientation of directions of polarisation of different wavelength constituents or elements, as the radiation passes through one or more electro-optic cell. Each electro-optic cell is used to provide modulation only of a selected constituent, and this is achieved by introducing a relative rotation, substantially equal to 45°, between the plane of polarisation of the selected constituent and that of the remaining constituents. This relative rotation is introduced by the input or first birefringent optical waveplate of the invention. The immediately following electro-optic cell is then oriented as described above to provide polarisation modulation of the selected constituent, which can subsequently be converted into intensity modulation. But this implies that the fast polarisation axis of the electro-optic cell is substantially parallel with or orthogonal to the direction of polarisation of the remaining constituents. The remaining constituents are not therefore resolved by the electro-optic cell and not modulated by it.

In a case where one or more of the remaining constituents have previously been polarisation modulated, they may be regarded, as noted above, as having two components in phase quadrature polarised initially parallel and perpendicular to the direction of polarisation of the selected constituent. The first birefringent optical waveplate introduces an angle substantially equal to 45° between the polarisation of the selected constituent and both components of the remaining constituents. Then one component of the remaining constituents is polarised parallel with the fast polarisation axis of the electro-optic cell, while the other component is orthogonally polarised. Neither of the two components is resolved within the electro-optic cell and their relative intensities are unaltered. Their phase relationship is altered, but this is of no significance in intensity modulation since one component is eventually to be completely absorbed at the analyser.

The second or output birefringent optical waveplate is used to provide a relative 45° rotation of the polarisation of the selected constituent with respect to the remaining constituents. In general this relative rotation is required to align the polarisation components of the selected constituent parallel with the corresponding directions of the components of the remaining constituents. This permits the selected constituent to be treated in the same way as remaining constituents in subsequent electro-optic cells, and eventually aligns polarisation components of all constituents so that a single optical analyser may convert all polarisation modulation into intensity modulation.

A second optical waveplate is required to follow each electro-optic cell, and a first optical waveplate is required to preceed the next electro-optic cell, except in the special case of a system for modulating two radiation constituents. In this special case, the distinction required between selected and remaining constituents is the same for the two electro-optic cells. The second optical waveplate following the first electro-optic cell and the first optical waveplate preceeding the second electro-optic cell would have cancelling effects, and therefore both may be omitted.

In practice neighbouring waveplates are preferably formed of a single piece of birefringent material i.e. the second optical waveplate following one electro-optic cell and the first optical waveplate preceeding the next electro-optic cell are, in effect, fused.

It is to be noted that there are two options on design of each first or input birefringent optical waveplate. It may be used to rotate the direction of polarisation of the selected or first radiation constituent through 45° while leaving the polarisation of remaining or second radiation constituents substantially unaffected. It may alternatively be used to rotate the polarisation direction of remaining or second constituents through 45° while leaving the polarisation of selected or first constituents substantially unaltered. Both options provide the required relative rotation, there is no general theoretical basis for a preference between the options, and both are included in the invention.

There are two similar but independent options on design of each second or output birefringent optical waveplate. It may be used either to rotate the direction of polarisation of the selected or first radiation constituent through 45°, or else to rotate the direction of polarisation of the remaining or second radiation constituent through 45°. Again both options provide the required relative rotation, there is no theoretical preference, and both are included in the invention.

Each of the two options on design of the first or input optical waveplate is usable with each of the two options on design of the second or output optical waveplate, in each optical system or sub-system employing two optical waveplates. A limited number of possible combinations of these options is described in detail below, but all combinations are included in the invention.

The angular orientations of each electro-optic cell and of the optical analyser, with respect to the direction of polarisation of the incident plane polarised beam, clearly depend on the polarisation rotations produced by all preceding optical waveplates. Each electro-optic cell is oriented, as described, with its fast polarisation direction oriented at 45° to the direction of polarisation of the radiation constituent to be modulated by the signal applied to that electro-optic cell. The analyser is oriented to absorb completely one component, as defined, of each of the modulated radiation constituents, while transmitting the other components.

The invention requires birefringent optical waveplates to provide rotation of the plane of polarisation of particular radiation constituents, distinguished by wavelength, while leaving the polarisation of other radiation constituents substantially unaltered. The design and manufacture of such waveplate is known, for example forming the basis for construction of the well known Lyot filter, (described for example in "Fundamentals of Optics" by Jenkins and White). In this filter, a series of crystalline quartz plates is used, each plate followed by an analyser which absorbs one plane of polarisation of the transmitted radiation. The thickness of each plate determines the proportion of each wavelength absorbed in the following analyser, since, according to the plate thickness, for some wavelengths the transmitted polarisation is unchanged, for some other wavelengths it is rotated through 90°, and for intermediate wavelengths the radiation is eliptically polarised.

Use of birefringent plates to provide a means for separate treatment of different wavelengths is therefore known. Hitherto, however, the separate treatment has (as in the Lyot filter) consisted merely of absorbing or separating one of the wavelengths or wavelength bands. The present invention excludes this simple filtering technique, but provides for the more complex requirements of independent modulation of different wavelengths.

As in the Lyot filter, the invention requires birefringent plates which for a first set of radiation wavelengths $\lambda_1$, $\lambda_2$ etc. will act substantially as whole waveplates, while for a second set of radiation wavelengths, $\lambda_1'$, $\lambda_2'$ etc., it will act substantially as a half waveplate. A radiation beam, containing all the wavelengths, is to be passed through the birefringent plate, and it is assumed that the beam is initially plane polarised in a first direction.

The birefringent plate may be made of a wide variety of birefringent materials, e.g. quartz or calcite, and preferably the optic axis of the birefringent material lies in the plane of the plate, i.e. orthogonal to the radiation propagation direction. The incident radiation is generally resolved into two parts within the waveplate, polarised orthogonally, travelling the same path but at different velocities. For each wavelength of radiation, the plate has two refractive indices, known as the ordinary and the extraordinary, corresponding to the two different radiation propogation velocities, one velocity for the part polarised parallel to the optic axis and the other velocity for the part polarised at right angles to the optic axis. The difference of these refractive indices, ($\Delta n_1$ for $\lambda_1$, $\Delta n_2$ for $\lambda_2$ etc., and $\Delta n_1^1$ for $\lambda_1^1$, $\Delta n_2^1$ for $\lambda_2^1$ etc.), with the thickness of the plate, may be used to calculate the distance by which the slow part is retarded with respect to the fast part, due to the plate, when the beam emerges from the plate. If the thickness of the plate is $t$, then the retardation is: $t \cdot \Delta n_1$ for $\lambda_1$, $t \cdot \Delta n_2$ for $\lambda_2$ etc., and $t \cdot \Delta n_1^1$ for $\lambda_1^1$, $t \cdot \Delta n_2^1$ for $\lambda_2$ etc.

Now, if the retardation is substantially equal to a whole number of wave lengths, the two part emerge in phase, and the polarisation state of the emerging radiation is substantially the same as that of the incident radiation. If the retardation is substantially equal to a whole number of wavelengths plus a half wavelength, the two components emerge out of phase, and the polarisation state of the emerging radiation is rotated with respect to the polarisation of the incident beam. In this latter case, the plate acts as a half-waveplate, which has the effect of rotating the polarisation direction of the incident radiation through an angle equal to double the angle between the initial polarisation direction and the optic axis. The thickness of the plate is selected so that the ratios:

$(t \cdot \Delta n_1/\lambda_1)$, $(t \cdot \Delta n_2/\lambda_2)$ etc are approximately equal to whole numbers, while the ratios:

$t \cdot \Delta n_1^1/\lambda_1^1$, $(t \cdot \Delta n_2^1/\lambda_2^1)$ etc. are approximately equal to whole numbers plus 0.5. Thus the radiation of wavelengths $\lambda_1$, $\lambda_2$ etc. is not substantially affected by the birefringent plate, while radiation of wavelengths $\lambda_1'$, $\lambda_2'$ etc. suffers substantially a rotation in its polarisation direction equal to double the angle between the optic axis and the incident radiation polarisation direction.

To produce the 45° relative rotations of planes of polarisation required in the invention, birefringent optical waveplate will be set with their optic axes at angles of 22.5° or 67.5° to the direction of polarisation of the incident beam. It will be noted that, when the incident beam has two orthogonally polarised components, the waveplate will rotate both polarisation directions through 45°.

In order that the invention may readily be carried into practice, two embodiments thereof will now be described in detail, by way of example, with reference to the accompanying drawings, in which:

FIG. 1 is a perspective schematic diagram showing an optical system for separately modulating two colours, along a single optical path; and FIG. 2 is a perspective schematic diagram showing an optical system for separately modulating three colours.

A first practical arrangement according to the invention is illustrated in FIG. 1, wherein two electro-optic cells 50 and 51 are used to provide separate intensity modulation of the blue and green components of a plane polarised beam 52 from an argon ion laser 53. Two crystalline quartz plates 54 and 55, 0.446 mm thick, are used respectively located before and after the electro-optic cells 50 and 51, and each acting as a whole waveplate for the 514 nm, green wavelength and as a half waveplate for the 488nm, blue wavelength.

It will be convenient to refer polarisation directions and directions of optic axes to the direction of polarisation of the initially incident beam 52. The laser beam 52 passes first into the quartz plate 54, which has its optic axis at 22.5° to the incident polarisation direction, so that the polarisation of the blue component is effectively rotated to 45° while that of the green component remains at 0°. The emergent beam 52' then passes through a Pockel cell 50 oriented to resolve incident radiation into two parts polarised at 0° and 90° and to introduce a relative retardation.

The green light has only a component at 0°, which emerges with no net change. The blue light emerges elliptically polarised and may be considered to consist of two phase-separated, plane polarised components with polarisation directions 45° and −45° respectively, the intensities of these components being controlled by the signal applied to terminals 150 and 151 of the first Pockel cell 50.

The emergent beam 52 '' then passes into a second Pockel cell 51 oriented to resolve incident radiation into parts polarised at 45° and −45° and introduce a relative retardation. The two components of the blue beam, (polarised at 45° and −45°) are each transmitted without a change in intensity or polarisation direction, although the phase separation of the components is in general modified. The green constituent emerges elliptically polarised and may be considered to consist of plane polarised, phase separated components with polarisation directions at 0° and 90°, the intensities of the two components being controlled by the signal applied to terminals 152 and 153 of the second electro-optic cell 51.

The emergent beam 52 ''' then passes through the second crystalline quartz plate 55, which has its optic axis at 22.5°. This plate rotates the planes of polarisation of the blue beam. The component initially polarised at 45° is rotated to 0°, and the component initially at −45° is rotated to 90°. The green light is transmitted without alteration. The emergent beam $52^{iv}$ then passes through an analyser 56, which transmits the incident components polarised at 90°, and absorbs the orthogonally polarised components. The intensity of the component of blue light in the finally transmitted beam $52^v$ is determined only by the signal applied to the first electro-optic cell 50, and the intensity of the finally transmitted component of green light is determined only by the signal applied to the second electro-optic cell 51.

If it is required to modulate only one group of wavelengths, the second electro-optic cell may be omitted.

In a second arrangement according to the invention three laser beam colours are separately modulated by signals applied to three electro-optic cells. The practical arrangement, shown in FIG. 2, illustrates a method of design for a modulation unit which will provide separate modulation for any number of different radiation wavelengths within a beam, without spatial separation of the different wavelength components.

In the arrangement of FIG. 2, there are three Pockel cells, 60, 61 and 62, used respectively to modulate the red, green and blue constituents within a laser beam 63, which is provided by a mixed gas argon/krypton ion laser 64. The beam passes through each of the cells, 60, 61 and 62, in succession, as described later.

The laser beam 63 is initially plane polarised, and it will be convenient again to refer polarisation directions and directions of optic axes to the initial polarisation direction. Each of the electro-optic cells 60, 61 and 62 is oriented to resolve the incident radiation into plane polarised parts with relative directions of polarisation at 0° and 90°, and to introduce a phase retardation according to the signal level applied to terminals of the respective cell.

Crystalline quartz plates 65 and 66 are respectively arranged immediately before and immediately after the first, red modulation, cell 60. These plates 65 and 66 both have their optic axes aligned at 22.5°, and the thickness of each is selected so that it acts as a half waveplate for red light and as a whole waveplate for blue and for green light.

Two further plates 67 and 68 are respectively arranged immediately before and immediately after the second, green modulation cell 61. These plates 67 and 68 have their optic axes at 22.5° and each has a thickness such that it acts as a half waveplate for green light but as a whole waveplate for other colours.

Similarly, two further plates 69 and 160 are respectively arranged before and after the third, blue modulation cell 62. Each plate 69 and 160 has its axis at 22.5°, and each has a thickness such that it acts as a half waveplate for blue light, but as a whole waveplate for other represented wavelengths.

In a system designed to provide modulation for a larger number, N, of radiation wavelengths, the line of cells would be extended to include N cells, and each cell would be set between two crystalline quartz plates. The thickness of each plate is calculated so that it acts as a half waveplate for the wavelength or wavelengths to be modulated by the associated electro-optic cell and as a whole waveplate for other represented wavelengths. Each cell is oriented to resolve incident radiation into the two components polarised at 0° and 90°, and introduce a phase retardation between these two components, dependent on the signal applied to the terminals of the cell. Each crystalline quartz plate has its optic axis at 22.5°.

Referring again to FIG. 2, the line of electro-optic cells 60, 61 and 62 and the associated quartz plates is terminated by an analyser prism 161, which deflects the incident component polarised at 0° and transmits the component polarised at 90°. The polarisation of the red light is rotated to 45° by the first quartz plate 65. The red light is then elliptically polarised by the first cell 60 so that it may be considered, on leaving the cell 60, to consist of phase separated, plane polarised components, with polarisation directions at 45° and =45°, the intensities of the two components being controlled by the signal applied to terminals 162 and 163 of the first cell 60. The polarisation direction of the first component, initially 45°, is rotated to 0° by the second quartz plate 66, while the polarisation of the second component is rotated to 90°. Each of these two components is then transmitted through the remaining cells and quartz plates without alteration in polarisation direction or intensity, though the phase separation of the components is altered. The component polarised at 90° is finally transmitted through the analyser 161 while the 0° component is absorbed. Thus, the intensity of the finally transmitted red light is controlled by, and only by, the signal applied to the terminals 162 and 163 of the first electro-optic cells 60.

Green light is transmitted through the first electro-optic cell 60 and its associated quartz plates 65 and 66 without alteration in polarisation direction or intensity. The second cell 61, with its neighbouring plates 67 and 68, acts on the green light, just as the first cell 60 with the associated plates 65 and 66 acts on the red light. The green light emerges from plate 68 consisting of phase separated, plane polarised components with polarisation directions at 0° and 90°, the intensities of the two components being determined by the signal applied to terminals 164 and 165 of the second cell 61. Both these components are transmitted to the analyser 161 without alteration in polarisation direction or in intensity. The analyser 161 transmits only the component polarised at 90°, so that the finally transmitted intensity of green light is determined only by the signal applied to the terminals 164 and 165 of the second cell 61.

Blue light is transmitted through both the first and second cells 60 and 61 and also through their associated quartz plates 65, 66 and 67, 68 without alteration in polarisation or intensity. The third cell 62, with its associated quartz plates 69 and 160, acts on the blue light just as the first cell with its associated plates 65 and 66, acts on the red light. The blue light emerges from plate 160 consisting of phase separated, plane polarised components, with polarisation directions at 0° and 90°, the intensities of the components depending on the signal applied to terminals 166 and 167 of the third cell 62. The analyser 161 transmits only the component polarised at 90°, so that the intensity of the finally transmitted blue light is determined only by the signal applied to terminals 166 and 167 of the third cell 62.

Many alternative arrangements are possible within the scope of the invention. Referring again to FIG. 2, the first waveplate 65 may have a thickness selected so that it acts as a half waveplate for both blue and green light and as a whole waveplate for red light. In this case all subsequent optical elements are then rotated through 45°. Any subsequent waveplate, 66, 67, 68, 69 or 160 may be similarly modified, to act as half waveplates for colours for which it was previously a whole waveplate and vice versa, with a 45° rotation of all following elements electro-optic cells, waveplates and the analyser.

Again any waveplate may be used with its optic axis at 67.5° to the incident polarisation direction, rather than at 22.5°, and these angles may be in either sense i.e. plus or minus either 22.5° or 67.5°.

Any electro-optic cell may be rotated 90° from the orientation specified. A 90° rotation of the analyser reverses the polarity of the intensity modulation produced, as does a 45° rotation of a relevant waveplate.

The order in which colours are polarisation modulated may clearly be altered simply by switching the positions of appropriate pairs of waveplates.

As indicated, the number of groups of wavelengths which can be independently modulated is theoretically capable of indefinite extension.

In practice, each neighbouring pair of quartz plates, such as 66, 67 and 68, 69 may be replaced by a single plate having the same net effect as the associated pair of plates described.

It should be noted that, although the practical embodiments described relate to apparatus for dealing with visible, laser light, the invention may be applied to apparatus for dealing with laser radiation outside the visible spectrum and to apparatus for dealing with radiation from sources other than lasers.

Further, the electro-optic cells used in the practical arrangements described may be either Pockel cells or Kerr cells as preferred.

I claim:

1. An optical system comprising a source of a beam of plane polarised polychromatic radiation and, in sequence in the path of the radiation beam an input birefringent optical waveplate, a first controllably birefringent electro-optic cell, an output birefringent optical waveplate, and an optical analyser; the radiation beam comprising two constituents distinguished by radiation wavelength; each birefringent optical waveplate being designed and arranged substantially to rotate the direction of polarisation of one beam constituent through 45° while leaving the state of polarisation of the other beam constituent substantially unaltered; the electro-optic cell being arranged to resolve a first radiation constituent into two substantially equal parts plane polarised at right angles and introduce a relative phase shift between these two parts, the magnitude of the phase shift being determined by an electrical signal applied to the first electro-optic cell, while leaving the state of polarisation of the second beam constituent substantially unaltered, whereby the first radiation constituent is polarisation modulated while the second radiation constituent is substantially unaffected; the optical analyser being arranged to transmit radiation plane polarised in a preferred direction at 45° to the directions of polarisation of the plane polarised parts of the first radiation constituent, thus converting the polarisation modulation of the first radiation constituent into intensity modulation, controlled by the electrical signal applied to the first electro-optic cell.

2. An optical system as claimed in claim 1, for modulation of two radiation constituents, in which a second controllably birefringent electro-optic cell is included in the radiation path between the first electro-optic cell and the output birefringent optical waveplate, the second electro-optic cell being arranged to resolve the second radiation constituent into two substantially equal parts plane polarised at right angles and introduce a relative phase shift between the two parts, the magnitude of the phase shift being determined by an electrical signal applied to the second electro-optic cell, while the state of polarisation of the first radiation constituent is substantially unaltered, whereby the second radiation constituent is polarisation modulated while the first radiation constituent is substantially unaffected; the optical analyser converting the polarisation modulation of both radiation constituents into intensity modulation, the intensity modulation of the first radiation constituent being determined substantially only by the electrical signal applied to the first electro-optic cell, while the intensity modulation of the second radiation constituent is determined substantially only by the electrical signal applied to the second electro-optic cell.

3. An optical system as claimed in claim 1, for modulation of a plurality of radiation constituents distinguished by wavelength, of which the said first radiation constituent is one, comprising, in sequence in the radiation path between the radiation source and the optical analyser, a set of sub-systems, each sub-system comprising, in sequence in the radiation path, a first birefringent optical waveplate, a controllably birefringent electro-optic cell and a second birefringent optical waveplate; the said input optical waveplate, first electro-optic cell and output optical waveplate together forming one such sub-system; each sub-system providing polarisation modulation of a different selected radiation constituent while leaving the polarisation of other radiation constituents substantially unaltered; in each sub-system the first and second optical waveplates being designed and arranged substantially to produce relative rotation of 45° between the directions of polarisation of the selected radiation constituent and the other radiation constituents; the electro-optic cell being arranged to resolve the selected radiation constituent into two substantially equal parts polarised at right angles and introduce a relative phase shift between these two parts, the magnitude of the phase shift being determined by an electrical signal applied to the electro-optic cell, while leaving the polarisation of the other radiation constituents substantially unaffected, whereby the selected radiation constituent is polarisation modulated while the remaining radiation constituents are effectively unaltered; the number of sub-systems thus providing substantially separate polarisation modulation for an equal number of selected radiation constituents, the polarisation modulation of all constituents being converted into intensity modulation by the optical analyser, the intensity modulation of each radiation constituent being determined by the electrical signal applied to the corresponding electro-optic cell.

4. An optical system comprising a light source at the commencement of a light path passing in sequence through a first birefringent optical waveplate means, a first controllably birefringent electro-optic cell, second birefringent optical waveplate means and an optical analyser; the light source providing light of first and second wavelengths plane polarised in a first polarisation direction; the first optical waveplate means being arranged to alter the direction of polarisation of light of said second wavelength to a second direction at substantially 45° to the first direction while leaving the direction of polarisation of light of said first wavelength unchanged; the electro-optic cell being arranged to introduce a relative phase shift between light plane polarised in the first direction and light plane polarised in a direction at 90° to the first direction; the magnitude of the phase shift being determined by an electric signal applied to the electro-optic cell, whereby light of said second wavelength is polarisation modulated but the polarisation of light of said first wavelength is unaltered; the second optical waveplate means being arranged to convert the polarisation modulated light into light formed of two plane polarised components in phase quadrature respectively parallel and perpendicular to said first direction; the amplitude of the two components being a function of the signal applied to the electro-optic cell, while leaving the polarisation of light of the first wavelength unchanged; and the optical analyser being arranged selectively to permit passage along the said light path of light polarised in a preferred direction but to inhibit passage therealong of light polarised in the direction at right angles to the preferred direction, the preferred direction being the first direction, and thereby to inhibit one component of light of the said second wavelength.

5. An optical system as claimed in claim 4, including, in the said light path, a second controllably birefringent electro-optic cell; the second electro-optic cell being positioned between the first and the second optical waveplate means, and said second electro-optic cell being arranged to introduce a relative phase shift between light plane polarised in the two directions at 45° to the first direction, the magnitude of the phase shift being determined by an electric signal applied to said second electro-optic cell, whereby it alters the polarisation only of light of said first wavelength to provide a beam comprising plane polarised components in phase quadrature respectively parallel and perpendicular to said first direction, the optical analyser inhibiting passage of one component of light both of the first and of the second wavelengths.

6. An optical system as claimed in claim 4, in which the said light source provides light of first, second and third wavelengths plane polarised in said first polarisation direction, and in which the said first and second optical waveplate means are associated with a first electro-optic cell, the system further including third and fourth optical waveplate means associated with a second electro-optic cell and fifth and sixth optical waveplate means associated with a third electro-optic cell, the first, second and third electro-optic cells, together with the associated pair of optical waveplate means, being arranged in sequence in the said ligh path between the said light source and the said optical analyser said first, second and third electro-optic cells and their associated pairs of waveplate means are so disposed that they are effective to polarisation modulate only said first, second and third wavelengths respectively.

7. An optical system as claimed in claim 4, in which the light source is a laser beam source.

8. An optical system as claimed in claim 4, in which the light source comprises an Argon ion laser.

9. An optical system as claimed in claim 6, in which the light source is a mixed gas Argon/Krypton ion laser.

10. An optical system as claimed in claim 4, in which the electro-optic cell, is a Pockel cell.

11. An optical system as claimed in claim 4, in which the electro-optic cell, is a Kerr cell.

12. An optical system as claimed in claim 4, in which each optical waveplate means is a crystalline quartz plate dimensioned to act as a whole waveplate for a selected wavelength and as a half waveplate at a selected other wavelength disposed with its optic axis at an angle of substantially 22.5° to the said first polarisation direction.

13. An optical system as claimed in claim 4, wherein the light of said first and second wavelengths is replaced respectively by light of first and second groups of wavelengths.

14. An optical system comprising a light source at the commencement of a light path passing in sequence through a first birefringent optical waveplate means, a first controllably birefringent electro-optic cell, second birefringent optical waveplate means and an optical analyser; the light source providing light of first and second wavelengths plane polarised in a first polarisation direction; the first optical waveplate means being arranged to alter the direction of polarisation of light of said second wavelength to a second direction at substantially 45° to the first direction while leaving the direction of polarisation of light of said first wavelength unchanged; the electro-optic cells being arranged to introduce a relative phase shift between light plane polarised in the first direction and light plane polarised in a direction at 90° to the first direction; the magnitude of the phase shift being determined by an electric signal applied to the electro-optic cell, whereby light of said second wavelength is polarisation modulated but the polarisation of light of said first wavelength is unaltered; the second optical waveplate means being arranged to convert the polarisation modulated light into light formed of two plane polarised components in phase quadrature respectively parallel and perpendicular to said first direction; the amplitude of the two components being a function of the signal applied to the electro-optic cell, while leaving the polarisation of light of the first wavelength unchanged; and the optical analyser being arranged selectively to permit passage along the said light path of light polarised in a preferred direction but to inhibit passage therealong of light polarised in the direction at right angles to the preferred direction, the preferred direction being at 90° to the first direction, and thereby to inhibit one component of light of the said second wavelength.

* * * * *